Figure 3:
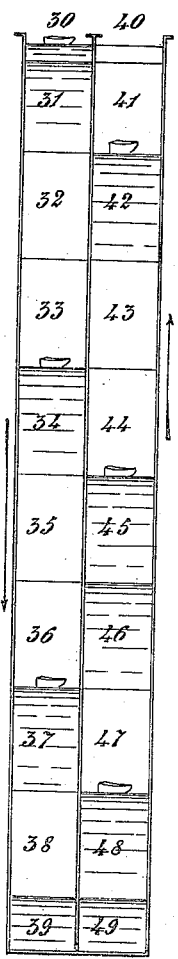

P. CAMINADA.
TUBULAR INCLINED SHIP LOCK.
APPLICATION FILED JUNE 25, 1907.
955,317.
Patented Apr. 19, 1910.
7 SHEETS—SHEET 1.
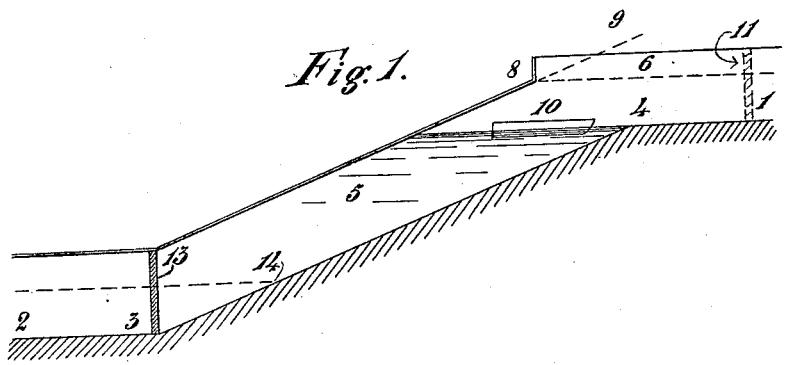
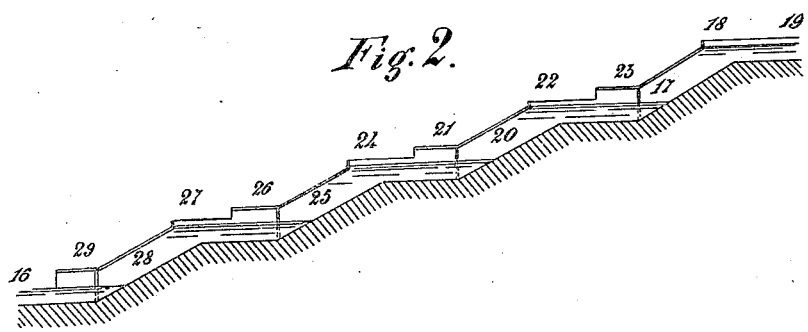
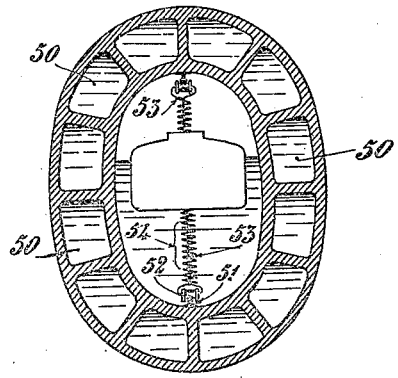
WITNESSES:
INVENTOR,
PIETRO CAMINADA,
by
Attorneys.

P. CAMINADA.
TUBULAR INCLINED SHIP LOCK.
APPLICATION FILED JUNE 25, 1907.

955,317.

Patented Apr. 19, 1910.
7 SHEETS—SHEET 2.

WITNESSES:

INVENTOR,
PIETRO CAMINADA,
by
Attorneys.

P. CAMINADA.
TUBULAR INCLINED SHIP LOCK.
APPLICATION FILED JUNE 25, 1907.

955,317.

Patented Apr. 19, 1910.
7 SHEETS—SHEET 3.

WITNESSES:

INVENTOR,
PIETRO CAMINADA.
by
Attorneys.

P. CAMINADA.
TUBULAR INCLINED SHIP LOCK.
APPLICATION FILED JUNE 25, 1907.
955,317.
Patented Apr. 19, 1910.
7 SHEETS—SHEET 4.
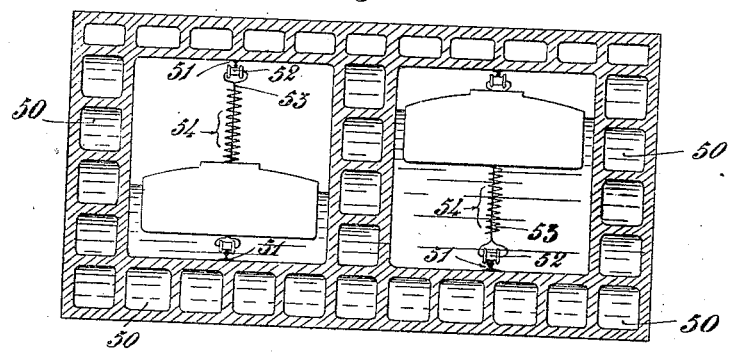
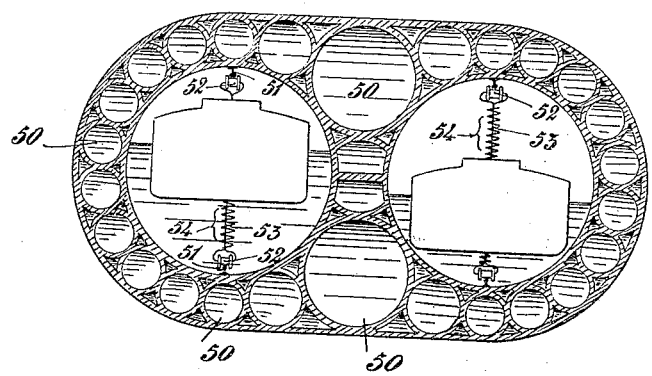
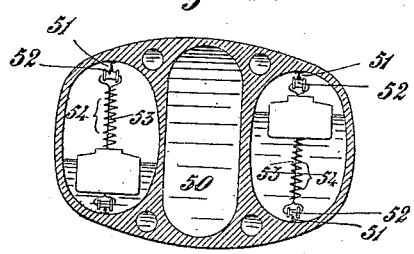
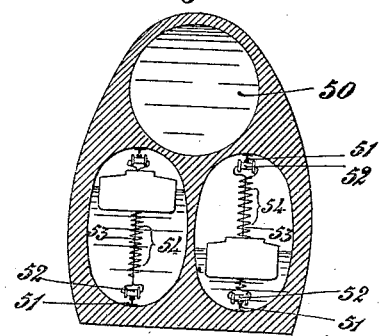
WITNESSES:
INVENTOR.
PIETRO CAMINADA,
by
Attorneys.

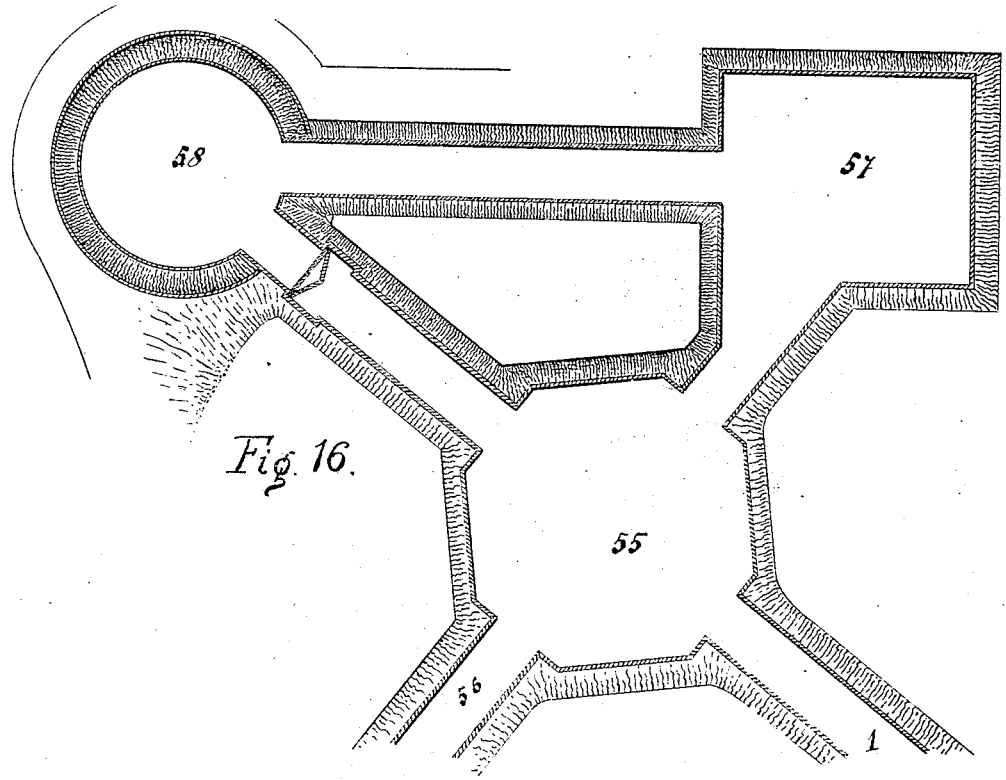
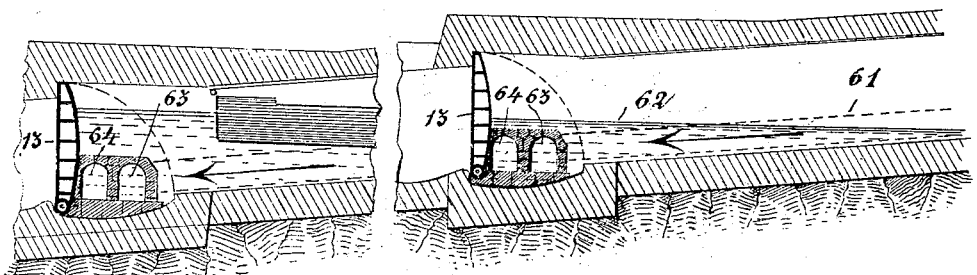
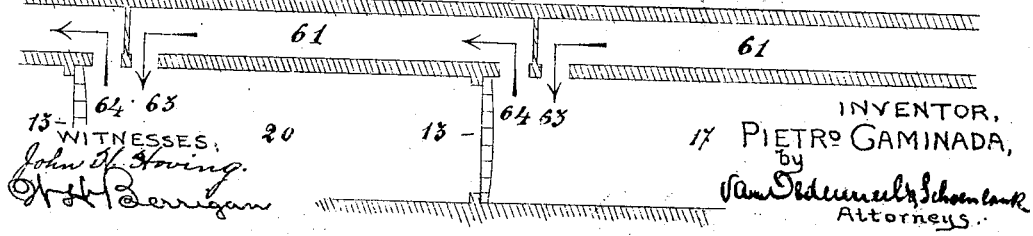

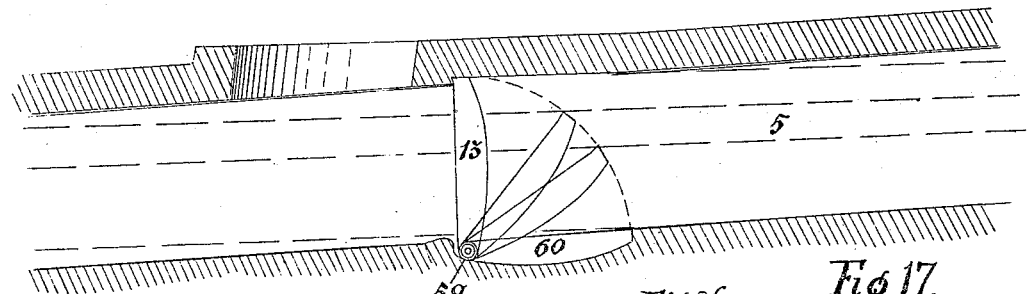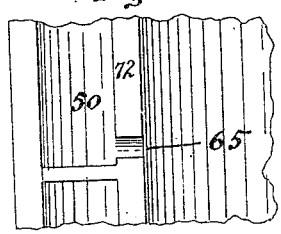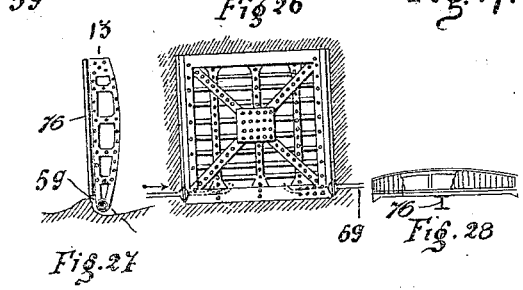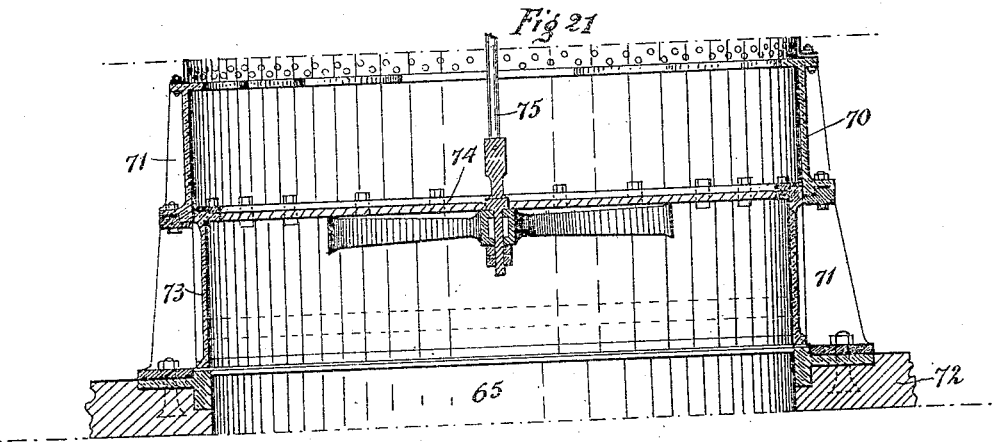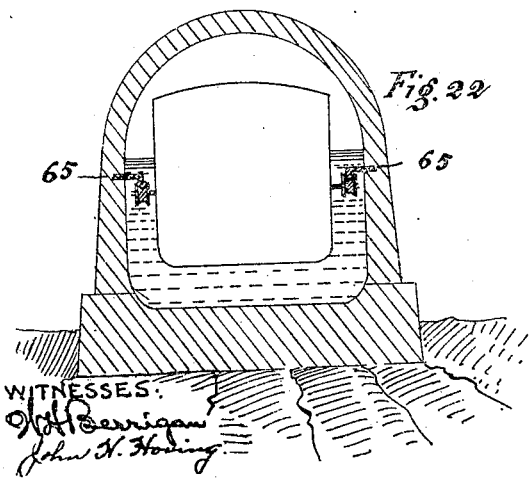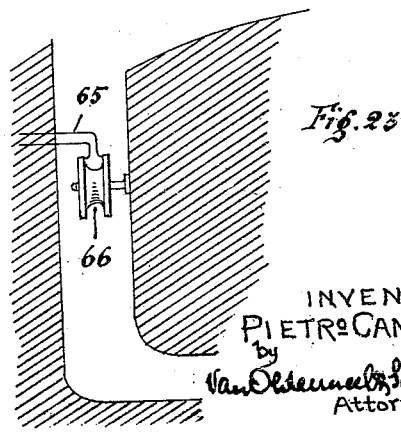

P. CAMINADA.
TUBULAR INCLINED SHIP LOCK.
APPLICATION FILED JUNE 25, 1907.

955,317.

Patented Apr. 19, 1910.
7 SHEETS—SHEET 7.

WITNESSES:
T. H. Berrigan
John H. Hoving

INVENTOR,
PIETRO CAMINADA,
by
Van Deventer & Schoenlank
Attorneys.

UNITED STATES PATENT OFFICE.

PIETRO CAMINADA, OF ROME, ITALY.

TUBULAR INCLINED SHIP-LOCK.

955,317.  Specification of Letters Patent.  Patented Apr. 19, 1910.

Application filed June 25, 1907. Serial No. 380,819.

*To all whom it may concern:*

Be it known that I, PIETRO CAMINADA, engineer, of Via Bergamaschi No. 58, Rome, in the Kingdom of Italy, have invented a certain new and useful Tubular Inclined Ship-Lock for Overcoming Falls of Any Height and Securing the Automatic Traction of Boats in Navigable Canals; and I do hereby declare the following to be a full, clear, and exact description of the invention, such as will enable others skilled in the art to which it appertains to make and use it, reference being had to the accompanying drawings, which form part of this specification.

The present invention relates to a tubular inclined ship lock by means of which boats are enabled to overcome easily falls of any magnitude in navigable canals. Said lock, as compared with those already known, offers in like manner as inclined planes the advantage of easily conforming itself to the conditions of the ground, without requiring to have the whole amount of the fall to be overcome gathered all in one point only, and moreover it allows the continuous and automatic progressing of the boats, without requiring mechanical towing means therefor and permits further a great economy in the lockage water or even, if wished, the consumption of water may be totally avoided.

The tubular inclined ship lock according to the present invention, is nothing else than a tunnel or tubular structure of convenient size and shape, laid on the ground, located in a cut or bored underground like an ordinary tunnel. Its cross section can be of any desired shape and size, in order to suit the shape and tonnage or draft of the standard boats admitted in same, and the inclination of the canal. The structure may be of any convenient material, according to the particular circumstances, although it will be understood that reinforced cement or concrete steel structures are particularly advantageous.

Figure 4:
Figure 5:
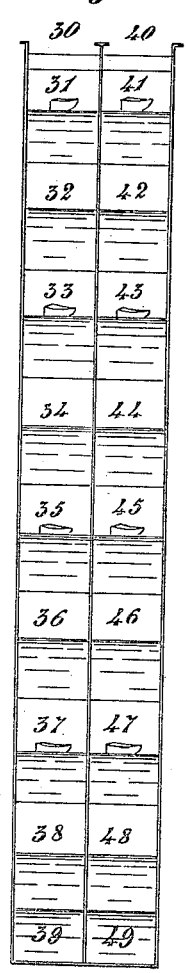
Figure 6:
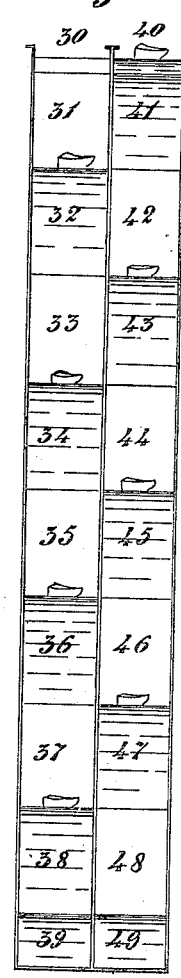
Figure 25:
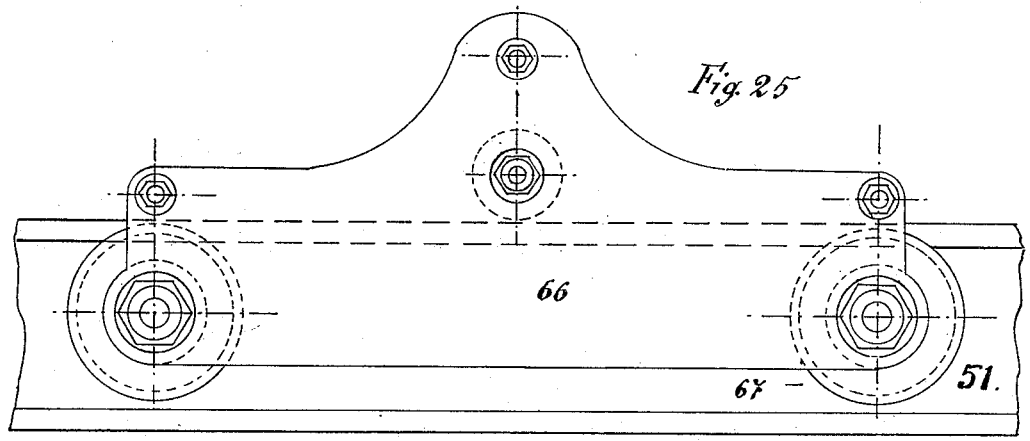
Figure 24:
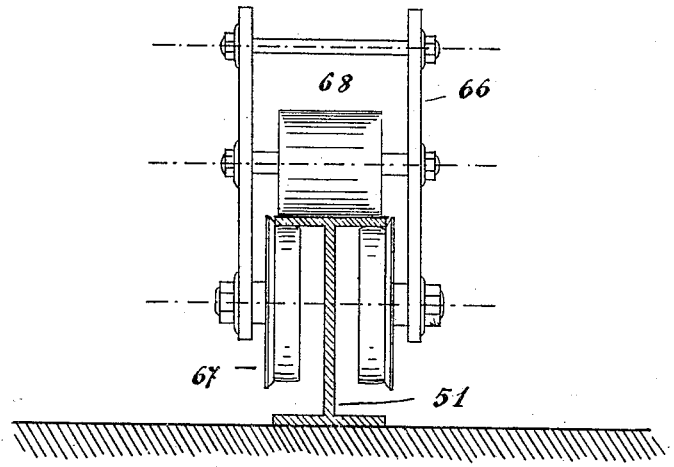

The annexed drawings illustrate schematically several forms of execution and the working of the tubular inclined lock according to the present invention, and more particularly: Figure 1 shows a vertical longitudinal section of an isolated tubular inclined lock of the single type. Fig. 2, a flight of single locks, that is of the type shown in Fig. 1, and which may be also arranged in a zigzag line. Fig 3 shows, schematically, a flight of double inclined tubular locks, whereby the two flights are coupled and formed in sections. Figs. 4, 5, 6 show the various steps of the lockage in a flight of double locks coupled together, and whereby the successive sections of each flight are in communication between them and communicate also with the adjoining sections of the other flight. Figs. 7, 8, 9, 10, 11, 12, 13, 14 and 15 show schematically by way of example several preferred forms for the cross section of the tubular inclined lock provided with storage reservoirs or not, although it should be understood that any other convenient shape and arrangement can be eventually adopted, for the single as well as for the double lock. Fig. 16 is a plan showing a crossing basin and side docks between two successive canals. Figs. 17 and 18 are longitudinal sections through a lock showing details of the gates. Fig. 19 a plan view of two successive locks showing the longitudinal conduits connecting them. Figs. 20 and 21 are details of the opening and of the valve connecting the lock with the water reservoirs. Figs. 22 and 23 show details of a lock with guiding rails on the side walls. Figs. 24 and 25 are details of the lock with a single guiding rail on the bottom. Figs. 26, 27 and 28 are structural details of the gate

*Single lock.*—The two canals —1—, —2—, Fig. 1 which are to be put in communication by means of the lock, —5—, end both in a crossing basin —55—, Fig. 16, which may be variously shaped. Similar crossing basins are also provided at those points where boats are to be crossed or the waterway changes abruptly its direction, as illustrated in Fig. 16, where the portions of canals —56—, —1— are about at right angle, or in connection with intermediate stations, providing side-docks —57— —58— where the boats can stop for loading or unloading, without hampering the traffic in the canal, and whence they easily start either in one, or in the other direction —56—, —1—. The upper crossing basin is separated from the head bay by a short canal the bottom of which is level with the bottom of the upper canal. The upper gate —11— is inserted between said short canal and the crossing basin. The lower end of the lock chamber communicates with a horizontal artificial tunnel, like an ordinary tunnel canal, and having a depth of water corresponding to the draft of the lower canal. A single leaf gate —13— Fig. 17, turning upon a horizontal axis —59— separates the tunnel from the lock chamber, —5—, when the latter is full of water and lies in a recess —60— provided in the bottom of the lock chamber, when the lock is empty.

The artificial tunnel above referred to, and which ends in the lower crossing basin wherein the water has constantly the same depth, balances in connection with the lower gate which shuts the bottom of the lock chamber, the pressure of the water column in the latter.

Longitudinal conduits —61—, Figs. 18 and 19, are provided for supplying the water from the upper canal in the bottom of the lock chamber under the level —62— of the water when the chamber is empty. Said level is the same as the level of the lower canal. The outlets —63— of said conduits are in the side walls, or in the bottom of the chamber under the keel of the boats having the deepest draft, as shown in Fig. 18.

It should be remarked that, when the lock is empty and the lower gate is shut, in the bottom of the chamber remains still sufficient water to allow one, or more boats, floating therein. It is not superfluous to add, that the locks according to the present invention allow the adoption of any known arrangement in use with ordinary locks for the purpose of diminishing the consumption of water and increasing the transit capacity.

*Action of the single lock.*—Assuming a boat to be ready for the ascent in the lower crossing basin, while the lock is empty the boat is first floated in the bottom —13—14— of the lock chamber, and then the longitudinal feeding conduits, which supply the water derived from the upper canal, are opened and water is admitted in the bottom of the chamber —5— until the water becomes even with the level of the upper canal, at the same time lifting also the boat to the upper said level. When the slope is very gentle the longitudinal, lateral, or underground conduits may be avoided by introducing directly the water from the upper canal into the lock chamber. The lock chamber having thus been filled, the upper gate —11— is opened, and the boat is floated out entering the short canal, and from this it passes into the upper basin. Thus the boat will have performed at the same time two distinct movements an ascending movement from below upward and a progression movement forward. The lock is now ready for lowering a boat. The descending boat enters firstly in the basin —6— at the top of the full chamber, then the upper gate —11— is closed and the communication between the lock chamber and the upper canal being thus shut, the discharge conduits —64—, Figs. 18 and 19 in the bottom of the chamber are opened and the water filling the chamber allowed to escape. The water level in the chamber lowers progressively, carrying down the boat which performs at the same time two distinct movements, the one downward and the other forward. As soon as the boat has reached the bottom of the chamber, and the level of the water is even with the level of the lower canal, the lower gate is opened, the boat goes through the artificial tunnel and takes its place in the lower crossing basin, whence it then prosecutes its course. During the ascent and the descent the boat is maintained in the required water depth by means of two grooved pulleys, one of which is on the prow and the other under the keel at the poop, for the descending boat and one under the keel at the prow and the other on the poop in the ascending boat. Said grooved pulleys run along two rails fastened the one against the bottom and the other against the roof of the tubular chamber. The object of the rails and of the pulleys is to maintain the boat in the required water depth and to prevent it shocking against the walls of the structure.

The tubular inclined lock according to the present invention is essentially characterized by two peculiar features, which are of the utmost importance. In the first place the cross section of the tubular structure —5— forming the inclined lock is considerably smaller than that which would be necessary for giving passage to a boat of the same size in the case of a vertical chamber, as it happens in ordinary locks, because it will be sufficient that the transversal width be equal to the width of the boat. The free surface of the water in the tube has a diameter in the longitudinal sense, which grows longer as the inclination of the tube to the horizontal diminishes, so that the more the tube approaches the horizontal, the more its size becomes small. Therein the tubular inclined lock differs substantially from the vertical lock now generally in use, the cross section of which must be greater than the boat section at the water line. It will be further seen that when the inclination differs very little from the horizontal, a tubular structure of moderate size will be able to receive a whole train of boats. It is also apparent to any one that the lock in accordance with the present invention is much more easily built than an ordinary lock having a vertical chamber, the length of which must be greater than the largest boat. Another essential feature, and also a very important one, is that in ordinary cases it is not necessary to build a totally closed structure, but only a partially closed one except when the canal is to be run in tunnel, so that when the successive sections are sufficiently long and the slope gentle the boat, instead of navigating in a closed tunnel, will actually navigate in a canal with inclined bottom and mostly, or even totally, uncovered, as it will be seen further more in detail. In fact, if the normal level in the upper canal —1— corresponds to the line —6—, it is evident that it is quite superfluous to build the portion —8—9— of the roof of the tubular structure above said line —6—, because the water never shall surpass said level.

Care must be taken that the interval between the upper gate —11— and the point —8— be sufficient for receiving the boat —10— when it reaches the upper level. Of course the lower gate —13— must also be located far enough from the point —14— wherein the lower level encounters the bottom wall of the lock chamber —5—, to give ample room to a boat floating on the water basin —13—14— without said boat shocking against the inclined bottom of the lock chamber. It will be also understood that the free room must be sufficient in order to allow the free rotation of the gate upon its horizontal axis, without being hindered in said movement by the boat.

For clearness' sake, and in order to avoid confusion, the drawings do not show the covered and uncovered parts of the tubular structure, and the inclined tubular lock will be hereinafter referred to always as a tubular lock, irrespective of the fact that portion, or even the whole length of same may be an uncovered canal, although it must be clearly understood that the structure will be a closed tubular one, only inasmuch as this is required by the particular circumstances of the locality.

*Stairway of inclined tubular locks.*—When the canal has to climb a slope of considerable height and it is not possible to follow a straight line having a constant incline, it will be more convenient from the economical point of view to establish a stairway of locks arranged in the manner hereinafter explained, and illustrated in Fig. 2 whereby each lock is communicating with the successive one, by means of longitudinal conduits —61—, Figs. 18 and 19. The water contained in the higher lock —17— is allowed to pass in the lock —20— immediately beneath, in the bottom of which is floating a boat ready for the ascent. While the water lowers in the lock —17— it drops also the boat floating in same, and at the same time the water immitted in the lock —20— lifts the boat floating therein. The boat which has been lowered in the lock —17— goes through the tunnel and reaches the crossing basin. The lock —20— is now ready for the descent of a boat, while the lock —17— is ready for lifting another boat. The water is immitted in the lock —17—, Fig. 19, through the opening —63— and is allowed to escape, when the lock must be emptied, and to reach the lock —20— immediately below, through the opening —64—.

As it has been before stated, each lock chamber, together with the short tunnel which follows downward and the short entrance canal preceding upward, are on the same axis in straight line, while the axis of the other locks, each one with its tunnel and its canal, may have any other direction, in which case the axes of the successive locks cut themselves in the crossing basin which forms the vertex of the angle, and performs the duties of a turntable in a railway. It appears then that, by arranging a whole stairway of said locks in zigzag line, it becomes possible to ascend a slope by following the shortest way and without it being necessary to lengthen the canal by superfluous detours. The action of a single lock, as above illustrated, can at the same time be performed by all the locks of the whole stairway, provided these are an even number and thus by means of the water contained in a single lock is effected the lockage each for a single lock of as many boats as twice the number of the locks diminished by a unit.

In order to have the water flowing regularly from one lock to the other it is necessary that all the locks have the same capacity, otherwise it would become necessary to arrange for a subsidiary water supply.

*Double lock with communicating chambers.*—Two inclined locks are arranged side by side in pairs one serving for the ascent, the other for the descent. Said locks have a common upper and lower crossing basin. Assuming that one lock is full and the other empty, a descending boat is floated in the full lock and an ascending boat in the empty lock. The two lock chambers are in communication by means of conduits provided at their bottom or by any other means. When the communication between the two chambers is established the water from the full chamber passes in the empty chamber, dropping the boat in the former and lifting the boat in the latter. At the end of the process the water level is even in both chambers and the two boats are at the same height. In order to complete the lockage, after having interrupted the communication between the two chambers, the water still remaining in the lock with the descending boat is all discharged, or utilized for feeding the lower canal, and other water derived from the upper canal is immitted in the lock with the ascending boat. Thus by a consumption of water not exceeding the half of that contained in a chamber a double lockage is effected that is of an ascending and of a descending boat. When the local circumstances render it convenient a flight of such double locks can be adopted for surmounting considerable heights. Each pair of locks will have one chamber full and the other empty and each pair will perform at the same time the lockage of two boats. It is apparent that while in the preceding case of a single lock with coupled chambers, the half of the water contained in a chamber is lost in accomplishing a lockage, now if there is a flight of double locks, said water will be utilized for accomplishing the lockage in the locks which follow immediately below, and have an ascending boat.

*Inclined tubular lock in sections.*—The single or double locks as illustrated above are suited for overcoming ordinary falls the height of which is not very considerable. When however it becomes necessary to overcome considerable heights interposed between points which are also in the horizontal direction much distant from each other, then the lock can be made sectional by inserting hermetical gates between two successive sections said gates working automatically, or not in their respective chambers. The total pressure of the water column will thus remain subdivided along the whole lock, which can run continuously for any given length, forming a double way tubular inclined canal, or even when the slope is gentle, an uncovered double way canal with inclined bottom and separated in sections. It is apparent that the possible arrangements are almost unlimited and therefore only two among the most important will be described here in a concise manner.

Each lock section has in its upper portion, immediately behind the barrage gate, which forms also the bottom of the section immediately following above, an uncovered portion which serves to aerate and illuminate the entire section. The length of said opening is depending from the inclination of the lock axis, because the smaller the inclination, the greater the uncovered portion. It may even happen, as already stated, that by reason of the size of the boats of large tonnage traveling in the canal or by reason of the small incline, it could be convenient to have the whole lock built as an open canal formed in sections, thus the tubular structure being substituted by a double way canal with inclined bottom.

Fig. 3 shows schematically, two inclined tubular locks subdivided in sections, the one for the ascent the other for the descent. Assumed that the sections —31—34—37— are all full with a boat floating in each of them to be dropped down, when the conduits between the sections —31— and —32—, —34— and —35—, —37— and —38— are opened, in which latter the depth of the water is the same as in the lower crossing basin —39—, the water of the higher section —31— passes in the section —32— lowering the boat and the same will happen between the sections —34— and —35— and —37— and —38—.

After this movement is accomplished the boats in the locks will have been transferred as follows. The boat which was in the section —31— will be at the top of the section —32—, the boat which was in the section —34— will be at the top of the section —35— and the boat which was in the section —37— will be at the top of the section —38—. The gates open automatically, when they are of the floating type as shown on the drawings, and the boats pass from one section to the other when the level begins to uncover the bottom of each chamber and before the boats reach the space reserved for the free movement of the gates or the gates may be operated mechanically in any of the manners now known in the art. In the lock for the ascent the sections —42— and —43— are full as well as the sections —45—, —46—, —48—. The draft of the latter is invariable and equal to the depth of the water in the lower crossing basin —49—. In order to lift the boat which is at the top of the section —42— it will suffice to fill by means of water, derived from the upper canal, the section —41— and the boat will be lifted until reaching the level of the upper canal —40—. At the same time the communication is established also between the full section —43— and the empty section —44— and between the full section —46— and the empty section —47—. The water descends from the section —43— in the section —44— and lifts the boat of the section —45— until it reaches the top of the section —44— and likewise the water which descends from the section —46— will lift the boat of the section —48— at the top of the section —47— and so on, irrespective of the number of the following sections.

The consumption of the water for the lockage, upward or downward, of a boat along the double tubular lock corresponds to the volume of water contained in a section, irrespective of the number of sections in the lock and of its total length. By means of this lock any mechanical towing becomes superfluous the water generates in the chambers or sections the movement carrying the boat which accomplishes two movements simultaneously, an upward or downward movement and a forward movement during the ascent as well as during the descent. It should be remarked also, that the translation movement from one section to the other is never stopped, this movement is a continuous one.

Another arrangement by means of which half of the lockage water can be spared and a higher transit capacity obtained is schematically shown in the Figs. 4, 5, 6. The action is as follows: Assumed that in the descent lock the sections —31—33—35—37— (Fig. 4) are full of water and the sections —32—34—36—38— are empty, that is that the sections are alternately full or empty and that each full section has a boat floating in it, the coupled ascent lock (Fig. 4) will have empty the sections —41—43—45—47— and full the sections —42—44—46—48— the latter having each at their top a floating boat. Conduits are provided by means of which the twin sections —31— and —41—, —32— and —42— and so on, communicate between them. Besides conduits are also provided by means of which each section communicates with the higher or lower section following immediately above or below. Said conduits can be of any approved and convenient system. By opening the communications between the twin sections, the water is brought in both at the same level, that is while the level lowers, and the boat is dropped in the section —31—, the level rises and the boat is lifted in the section —41— and at the end the boats are at the same height. The action as described with reference to the sections —31—, —41—, takes place simultaneously in the sections —33— and —43—, —35— and —45—, —37— and —47— as it clearly appears from the schematical Fig. 5. Then the communication is established between the full section —42— and empty section —32—, the full section —44— and the empty section —34—, and between the sections —46— and —36—, —48— and —38— and the water is brought to the same level in said twin sections. Now the lock is as follows: Two twin sections each with a boat and the two twin sections immediately below half full, and without boat, and this for the whole length of the lock, that is the successive sections have alternately a boat and the gates separating two successive sections are closed. For dropping the boat which is in the section —31— it will suffice to open the communication between said section and the section —32— immediately following below, and so for all the subsequent sections, that is between the sections —33— and —34— —35— and —36—, —37— and —38—. At the same time water is immitted from the upper canal into the section —41— thus raising the boat until the level of the upper canal —40—. The water filling the section —42— is allowed to descend into the section —43—, the water of the section —44— into the section —45— and the water of the section —46— into the section —47—. The water contained in the section —48— can be utilized for feeding the lock or the lower canal, following immediately below. Thus the disposition shown by Fig. 6 is reached viz. the boat which was at the top of the section —31— is now at the top of the section —32—, the boat which floated at the top of the section —33— is now lowered to the top of the section —34— and so on; this as far as regards the descent lock. In the ascent lock the boat which floated at the top of the section —42— is now lifted to the top of the section —41—; the boat which floated in the section —44— is now lifted to the top of the section —43— and so on.

The double lock now described has a transit capacity which is double that of the transit capacity of the lock described before, because while this requires that during the lockage of a boat in a section the two preceding ones be without a boat in them, the latter arrangement instead allows a boat to be floating in half of the sections. It is therefore evident that the arrangement must be preferred when the traffic intensity requires the greatest possible saving of time. It has further the advantage of requiring only half the volume of water required by the other for the lockage of a boat. Both systems are suitable for overcoming great falls also between very distant points, the length of the lock not interfering with its regular working. In order to take advantage of the inexpensive traction of the boats by means of the movement of the water it is rather advisable to employ a more extensive application of the inclined tubular locks letting them act not only as inclined tubular locks, but also as open doubleway canals with inclined bottom, subdivided in sections. In this case the upper guide rail will be supported by means of a convenient framing, so that the automatical progression of the boats is obtained in the same manner as in the case of the tubular lock.

Constructive details are not illustrated here, because the knowledge of the general arrangement of the lock, will be sufficient for the person skilled in the art for working out the constructive details better suited to the particular circumstances in each case.

The arrangement of the locks illustrated above can be also adopted in the case of long tunnels, though in this case particular provisions are necessary in order to prevent the disturbance in the atmospheric pressure, in connection with the movement of the water which would produce alternately a rarefaction or a compression. For this purpose each section is provided with a conduit which permanently maintains the interior of the tunnel in free communication with the external atmosphere. When, while the water of the section is discharged in the section below, the rarefaction begins in the interior, fresh air is sucked from without through said conduit and reversely when the empty section receives water from a full section, the air escapes outward through the same conduit. Finally in the case of tunnels joining canals laid on the opposite slopes of a mountain, in order to take advantage in this case also of the automatic traction of the boats, it is convenient to build two separate and parallel tunnels having opposite inclinations, so that the water which starts from a slope may reach the other and then return back to the slope from which it had been derived. By means of this arrangement the current is utilized in both directions.

*Inclined tubular locks with tubular peripheric storage reservoirs.*—When the water supply is scarce and the consumption must therefore be reduced it is convenient to provide the locks with storage reservoirs, arranged in any convenient manner according to the particular circumstances.

Figure 8:
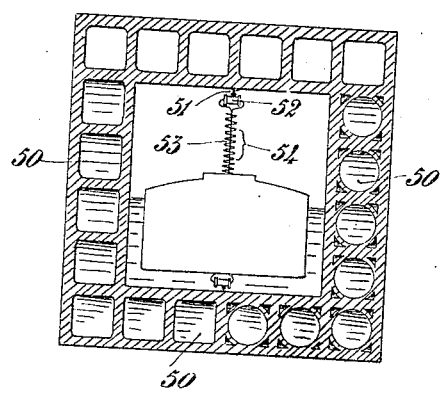
Figure 9:
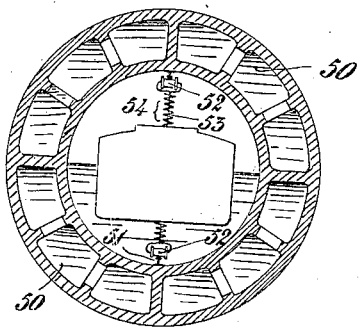
Figure 10:
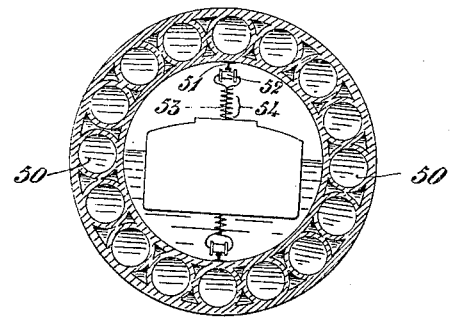
Figure 11:
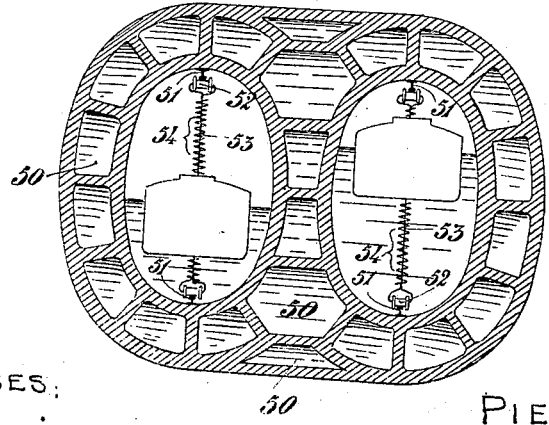

Fig. 7 shows the transverse section of an elliptical tubular lock having storage peripheric reservoirs arranged between the double walls of the lock body. Fig. 8 shows a lock having a square transverse section with circular or square shaped lateral reservoirs. Fig. 9 shows a lock having a circular transverse section and provided with trapeziform reservoirs. Fig. 10 is the transverse section of a tubular lock with circular shaped peripheric reservoirs. Fig. 11 is the transverse section of a double lock with peripheric reservoirs. Figs. 12 and 13 show respectively the transverse section of a square lock with reservoirs and a double circular lock with storage reservoirs. Figs. 14 and 15 show transverse sections of double locks with a common storage reservoir.

The figures above enumerated show schematically and by way of example only, a few of the forms which may be adopted for the lock, although it will be readily understood that any other convenient form may be advantageously adopted according to the particular circumstances.

It should be remarked that the reservoirs are in communication with the lock through openings —65—, as shown in Fig. 20, wherein are fitted shutting valves of any convenient system, and operated from outside, for instance of the kind shown in Fig. 21 and are subdivided in separate compartments, so that during the descent the water fills them successively and during the ascent their water is discharged in the interior of the lock chamber. The valve shown in Fig. 21 has a cylindrical shape with lateral admission of the water. It is formed by an upper guiding cylinder —70— supported at a convenient height above the opening 65 by means of standards 71 bolted or otherwise firmly secured to the walls 72. A second movable cylinder 73 having internally the same diameter of the hole 65 is adapted to fit with its lower edge against the edge of the hole 65. The movable cylinder 73 is provided at its top with a cover 74 to which is secured a rod 75 by means of which the movable cylinder 73 is made to slide up and down in the interior of the cylinder 70. It will be understood that, as soon as the lower edge of the cylinder 73 is no more in contact with the edge of the opening 65 the water will flow through the annular opening thus formed either from the lock into the reservoir 50 or from the reservoir 50 into the lock. This class of shutting valves being already known in the art are described here only for clearness sake, and it will be understood that any other kind of valve can be utilized also for the same purpose. By means of said reservoirs, when they are airtight it becomes possible to store up a considerable quantity of compressed air which can then be utilized for driving auxiliary machinery.

All the arrangements hereinbefore described show the lock chamber as well as the storage reservoirs, in communication with the open air. It is however possible by building them airtight and provided with hermetical gates, to further lower the water consumption by adopting the air rarefaction, or the barometric vacuum, or the compressed air, or the vacuum in connection with compressed air for producing the circulation of water in the reservoirs and the lock in any of the manners already known in the art, and which are not described more in detail because they do not form a part of the present invention.

In both the preceding cases whether rarefied air and barometric vacuum, or barometric vacuum and compressed air are utilized, the reservoirs, and in the first case the lock chambers also, must be built absolutely water and air tight and for this purpose it could be convenient to cover the walls of the lock and of the reservoirs by means of metal sheets and to secure the most absolute impermeability by all the processes known in the art.

When the boat moves in an inclined tubular lock it is necessary to guide it, in order to keep it continually in the depth of water required by its draft, and to prevent any shock against the walls of the structure. For this purpose, two rails —51— are provided, which run in the direction of the axis of the lock, one of them fastened to the bottom of the lock and the other to the roof. The lock being of any one of the types already described or even of any other type. Two grooved pulleys —52— (Figs. 7 to 15) mounted on sliding rods —53—, which stretch out from the body of the boat, run along said rails. The length of the rods —53— is controlled by means of spiral springs —54—, which are always urging them out from the body of boat and keep the pulleys against the rails. Said rails and grooved pulleys compel the boat to advance while the water raises it. Thus a translation movement is obtained, the speed of which is proportioned to the time required for filling up each section or chamber, and said movement or progression of the boat takes place automatically without being necessary to use any mechanical means. In the case of an open doubleway canal with inclined bottom, and formed in sections, the upper rail is fastened to elevated supports, so that the boats are compelled, as in the case of the inclined tubular lock, to advance forward in the same time that the water rises or lowers and the upper rail is necessary for securing said advancement, otherwise the automatical progression would take place only during the descent and the movement of the boat would result an irregular and unsteady one. Instead of the elevated rail in the middle of the canal, two rails —65—, Figs. 22 and 23, fastened to the lateral walls of the canal can be adopted with the same result. The two rails must have the same inclination of the canal bottom and the grooved pulleys —66— must be arranged to run below them. A simpler arrangement however is to have the movement of the boat controlled by means of the lower rail only, which in this case must be so shaped as to retain the pulley both in its upward and downward movements. A practical form of execution of said arrangement is shown in the Figs. 24 and 25; the bottom rail —51— has the shape of a double T and the pulleys are mounted on a little truck —66—, and there are provided two pulleys —67— which run under the upper edges of the rail when the boat is raised, and a pulley —68— which rests against the top of the rails.

The gates inserted between the subsequent sections, or chambers, may be of any approved system and automatical or not in their operation. Their movements when they are of the floating type as shown in the Figs. 17, 26, 27, 28, can also be controlled by means of compressed air in the following manner. Assumed that the gates have a single leaf rotatably mounted upon a fixed shaft —59— fastened horizontally to the bottom of the chamber, and that they are double wall gates with separate air tight compartments each in communication with a conduit —69— provided in the hollow shaft, when the gate is open it lies on the bottom in a recess —60— provided for this purpose and with all compartments full of water. The weight of the gate exceeds the weight of the displaced water and it remains therefore immovable. In order to close the gate compressed air is immitted through the hollow shaft in its compartments, the filling water is thus forced out, the weight of the gate diminishes, and under the pressure of the water the gate rises and closes the passage. Means are provided as usual for rendering watertight the joints between the gate and the resting surfaces. The gate remains closed under the action of the water pressure exerted on its back. The reverse operation is to be performed for opening the gate. The compressed air in the interior of the gate is allowed to escape and the water to fill the compartments between the double walls. The gate thus becomes heavier than the displaced water rotates about the horizontal shaft and falls into the recess in the bottom of the lock. The section of the lock in the point where the gate is applied, must provide sufficient room for allowing the movement of the gate.

Instead of the gate operated by means of compressed air in the manner above stated, it is evident that any other type of gates may be conveniently adopted, either gates with air tight compartments always filled with air and permanently floating, so that they follow the ascending or descending movement of the water, or gates with water counterweights, or floating counterweight, or operated in any other convenient manner.

In that portion of the bottom, wherein is cut the recess for receiving the gate, the lower rail is interrupted and in continuation of same a piece of rail (76, Figs. 27 and 28) is fastened on the upper face of the gate.

Claims.

1. A canal lock for transferring boats from a canal section to another comprising a tubular inclined chamber, a gate at the bottom of same where ends the lower canal, a gate at the top where begins the upper canal, means for immitting water at the bottom of the chamber and filling same, means for emptying the lock chamber and means for operating the gates.

2. A canal lock for transferring boats from a canal section to another, comprising a chamber with inclined bottom, open at the top, where its walls surpass the level of the upper canal, gates at the bottom and at the top where end the lower and the upper canal, means for immitting water in the chamber and emptying the same, and means for operating the gates.

3. A lock for transferring boats from a canal section to another comprising a chamber with inclined bottom, guides on the walls of said chamber, rollers conveniently connected to the body of the boat and sliding along said guides, while the boat is transferred from one canal to the other, means for immitting water in the chamber and emptying same, gates at its top and its bottom where end the upper and the lower canal, and means for operating said gates.

4. A lock for transferring boats from a canal section to another, comprising a succession of chambers with inclined bottom, gates operated in any convenient manner between said chambers, longitudinal conduits allowing the passage of the water from the bottom of one chamber to the bottom of the chamber immediately below, guides on the walls of the chambers and rollers fitted on the hull of the boat to slide along said guides, while the boat is raised or lowered.

5. A lock for transferring boats from a canal section to another, comprising a chamber with inclined bottom, water reservoirs around the walls of said chamber, means for putting in communication the reservoirs with said chambers, gates at the top and the bottom of the chamber and means for operating same.

6. A lock for transferring boats from a canal section to another comprising two chambers, twin chambers, with inclined bottom, gates at their top and their bottom, a communication between said chambers allowing the passage of the water from the one to the other, means for closing and opening said communication, and means for immitting water into the bottom of the chambers and for discharging same.

7. A lock for transferring boats from a canal section to another, comprising a chamber with inclined bottom, a guide on the bottom of said chamber, gates at both ends of same, a recess on the bottom to receive the lower gate when open, a guide on the outer surface of the lower gates which, when the gate is swung down forms a continuation of the bottom guide of the chamber, and means for immitting water in the chamber and emptying same.

In witness whereof I have hereunto set my hand in presence of two witnesses.

PIETRO CAMINADA.

Witnesses:
RENATO SCEVALA,
A. ROZI.